(12) United States Patent
Oh

(10) Patent No.: US 10,778,108 B2
(45) Date of Patent: Sep. 15, 2020

(54) FREQUENCY DOUBLING RESONANT CONVERTER

(71) Applicant: Apple Inc., Cupertino, CA (US)

(72) Inventor: InHwan Oh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 16/410,666

(22) Filed: May 13, 2019

(65) Prior Publication Data

US 2020/0266719 A1    Aug. 20, 2020

Related U.S. Application Data

(60) Provisional application No. 62/806,351, filed on Feb. 15, 2019.

(51) Int. Cl.
| | |
|---|---|
| *H02M 3/335* | (2006.01) |
| *H02M 7/5387* | (2007.01) |
| *H02M 7/217* | (2006.01) |
| *H02M 1/08* | (2006.01) |
| *H02M 7/06* | (2006.01) |
| *H02M 7/48* | (2007.01) |

(52) U.S. Cl.
CPC ....... *H02M 3/33592* (2013.01); *H02M 1/083* (2013.01); *H02M 7/06* (2013.01); *H02M 7/217* (2013.01); *H02M 7/5387* (2013.01); *H02M 2007/4815* (2013.01)

(58) Field of Classification Search
CPC ........... H02M 2001/0058; H02M 1/42; H02M 1/4208; H02M 1/08; H02M 3/335; H02M 3/33569; H02M 3/33546; H02M 3/33576; H02M 3/337; H02M 3/33507; G05F 1/44; G05F 1/10

See application file for complete search history.

(56) References Cited

U.S. PATENT DOCUMENTS

| | | | | |
|---|---|---|---|---|
| 5,581,454 A | * | 12/1996 | Collins | H02M 3/07 363/59 |
| 7,239,530 B1 | * | 7/2007 | Djekic | H02M 3/285 323/222 |
| 7,696,735 B2 | * | 4/2010 | Oraw | H02M 3/07 323/282 |

(Continued)

*Primary Examiner* — Thienvu V Tran
*Assistant Examiner* — Nusrat Quddus
(74) *Attorney, Agent, or Firm* — Blank Rome LLP

(57) ABSTRACT

A frequency doubling resonant converter can include a dual half bridge resonant converter configured to receive an input DC voltage and convert it to an frequency doubled AC voltage having a frequency twice the switching frequency of the dual half bridge resonant converter. The converter can further include a step down transformer configured to reduce the frequency doubled AC voltage to a stepped down AC voltage. The converter can further include a rectifier configured to convert the stepped down AC voltage into a DC output voltage for delivery to a load. The converter may optionally include an interphase transformer coupled between the step down transformer and the rectifier and configured to increase an output current of the converter. The frequency doubling resonant converter may be configured, for example, to double an output current received from the step down transformer.

18 Claims, 6 Drawing Sheets

(56) References Cited

U.S. PATENT DOCUMENTS

| | | | | |
|---|---|---|---|---|
| 7,907,429 B2* | 3/2011 | Ramadass | | H02M 3/07 307/110 |
| 8,427,113 B2* | 4/2013 | Xing | | H02J 7/0065 320/140 |
| 8,687,382 B2* | 4/2014 | Chen | | H02M 1/4258 363/16 |
| 8,729,819 B2* | 5/2014 | Zhao | | H02J 1/14 315/185 S |
| 8,917,528 B2* | 12/2014 | Xu | | H02M 3/33507 363/21.12 |
| 9,287,782 B2* | 3/2016 | Chen | | H02M 3/1582 |
| 9,473,034 B2* | 10/2016 | Huang | | H02M 3/33523 |
| 9,762,128 B2* | 9/2017 | Zhang | | H02M 3/33507 |
| 9,853,460 B2* | 12/2017 | Ichikawa | | H02M 3/1582 |
| 2009/0316443 A1* | 12/2009 | Coccia | | H02M 1/10 363/21.06 |
| 2011/0273911 A1* | 11/2011 | Torrico-Bascope | | H02M 3/33592 363/21.02 |
| 2012/0300519 A1* | 11/2012 | Clemmons | | H02M 7/2173 363/127 |
| 2013/0181620 A1* | 7/2013 | Zhao | | H05B 33/0809 315/188 |
| 2013/0201730 A1* | 8/2013 | Luo | | H02M 3/285 363/21.17 |
| 2013/0265016 A1* | 10/2013 | Chang | | H02M 1/08 323/271 |
| 2014/0112026 A1* | 4/2014 | Pan | | H02M 3/33569 363/21.02 |
| 2014/0346962 A1* | 11/2014 | Sanders | | H05B 33/0815 315/193 |
| 2017/0317601 A1* | 11/2017 | Jin | | H02M 3/28 |
| 2018/0198367 A1* | 7/2018 | Zhang | | H02M 3/07 |

* cited by examiner

_US 10,778,108 B2_

FREQUENCY DOUBLING RESONANT CONVERTER

BACKGROUND

Performance advances in central processing units (CPUs) and graphics processing units (GPUs) used in various computing applications have led increasingly demanding power supply requirements. In some cases, the power requirements of high end desktop workstations are approaching the power limits of commonly available wall receptacles (e.g., 15 A at 120Vac in the United States). To deliver as much power as possible from this limited source to these high performance computing elements, efficiency of the power supply becomes critical. Additionally, with modern processing devices operating at relatively low voltages, high currents—sometimes in the 100s of amperes—may be required. These high currents can be detrimental to high efficiency, because even small DC resistances in the power supply path can dissipate significant power at such current levels.

The final stage power supply for a CPU or GPU is sometimes known as a voltage regulator module, or "VRM." VRMs may be configured to take an input voltage level (for example, 5Vdc) and convert it to the lower level required on-chip by the processor (for example, approximately 1Vdc). Input voltage levels of 5Vdc have been used in many VRM applications because the 5V to 1V conversion ration can be easily implemented as a two phase or four phase buck converter. With increasing power levels, and the associated increasing current, this becomes impractical for the reasons mentioned above. Increasing the input voltage, for example to 12Vdc, can alleviate some of these issues. However, because the voltage conversion ratio of a buck converter is directly proportional to its duty cycle, an excessive number of phases may become required to supply the required power to the load. This excessive number of phases may be undesirable for a number of reasons, including increased cost (because of the large number of components), decreased efficiency (because of increased switching losses, which may be exacerbated by hard switching in a buck converter).

Thus, it would be desirable to provide a power converter topology suitable for VRM (and other applications) that allows for high power handling with high efficiency and reduced costs.

SUMMARY

A frequency doubling resonant converter can include a dual half bridge resonant converter configured to receive an input DC voltage and convert it to an frequency doubled AC voltage having a frequency twice the switching frequency of the dual half bridge resonant converter. The converter can further include a step down transformer configured to reduce the frequency doubled AC voltage to a stepped down AC voltage. The converter can further include a rectifier configured to convert the stepped down AC voltage into a DC output voltage for delivery to a load. The converter may optionally include an interphase transformer coupled between the step down transformer and the rectifier and configured to increase an output current of the converter. The frequency doubling resonant converter may be configured, for example, to double an output current received from the step down transformer.

The dual half bridge resonant converter may include a ladder of four switching devices coupled between positive and negative rails of the input DC voltage supply. The ladder of switching devices may be operated in a two half-bridge toggle operation. A resonant circuit and a primary winding of the step down transformer may be coupled in series between a junction of a first and second switching device in the ladder and a junction of a third and fourth switching device in the ladder. The resonant circuit may be a series LC circuit. The rectifier may include one or more diodes or one or more synchronous rectifier switches.

A method of producing a DC output voltage can include using a dual half-bridge resonant inverter to convert an intermediate DC voltage into a frequency doubled AC voltage, the frequency doubled AC voltage having a frequency twice a switching frequency of the dual half-bridge resonant inverter; stepping down the frequency doubled AC voltage to produce a stepped down AC voltage; and rectifying the stepped down AC voltage to produce the DC output voltage. The intermediate DC voltage may be produced by converting an AC mains voltage into the intermediate DC voltage. The method may further include using an interphase transformer to double a current of the stepped down voltage. In such a case, rectifying the stepped down AC voltage comprises rectifying the current doubled stepped down voltage. Using a dual half-bridge resonant inverter to convert an intermediate DC voltage into a frequency doubled AC voltage may include operating a ladder of switching devices in a two half-bridge toggle operation, which may further include zero voltage switching of the switching devices.

A voltage regulator module for supplying power to a processor can include a dual half bridge resonant converter, a step down transformer, an interphase transformer, and a rectifier. The dual half-bridge resonant converter may be configured to receive an input DC voltage and convert it to an frequency doubled AC voltage having a frequency twice the switching frequency of the dual half bridge resonant converter further. The dual half-bridge resonant converter may include a ladder of four switching devices coupled between a positive DC voltage rail and a negative DC voltage rail, and a resonant circuit coupled between a junction of first and second switching devices of the ladder and a junction of third and fourth switching devices of the ladder. The step down transformer may reduce the frequency doubled AC voltage to a stepped down AC voltage. The step down transformer may have a primary winding coupled in series with the resonant circuit between a junction of first and second switching devices of the ladder and a junction of third and fourth switching devices of the ladder and a secondary winding. The interphase transformer may be configured to double a current of the stepped down AC voltage and may have a primary winding coupled in series between a first terminal of the step down transformer secondary winding and a first terminal of an output capacitor and a secondary winding coupled in series between a second terminal of the step down transformer secondary winding and the first terminal of the output capacitor. The rectifier may include first and second rectifier devices coupled to a second terminal of the output capacitor and respectively coupled to first and second terminals of the secondary winding of the step down transformer. The first and second rectifier devices may be diodes having anodes coupled to the second terminal of the output capacitor and cathodes respectively coupled to the second and first terminals of the secondary winding of the step down transformer. Alternatively, the first and second rectifier devices may be synchronous rectifier switches having drains coupled to the second terminal of the output capacitor and sources respectively coupled to the second and first terminals of the secondary winding of the step down transformer. The resonant circuit may be an LC circuit, particularly a series LC circuit.

DETAILED DESCRIPTION

Figure 1A:
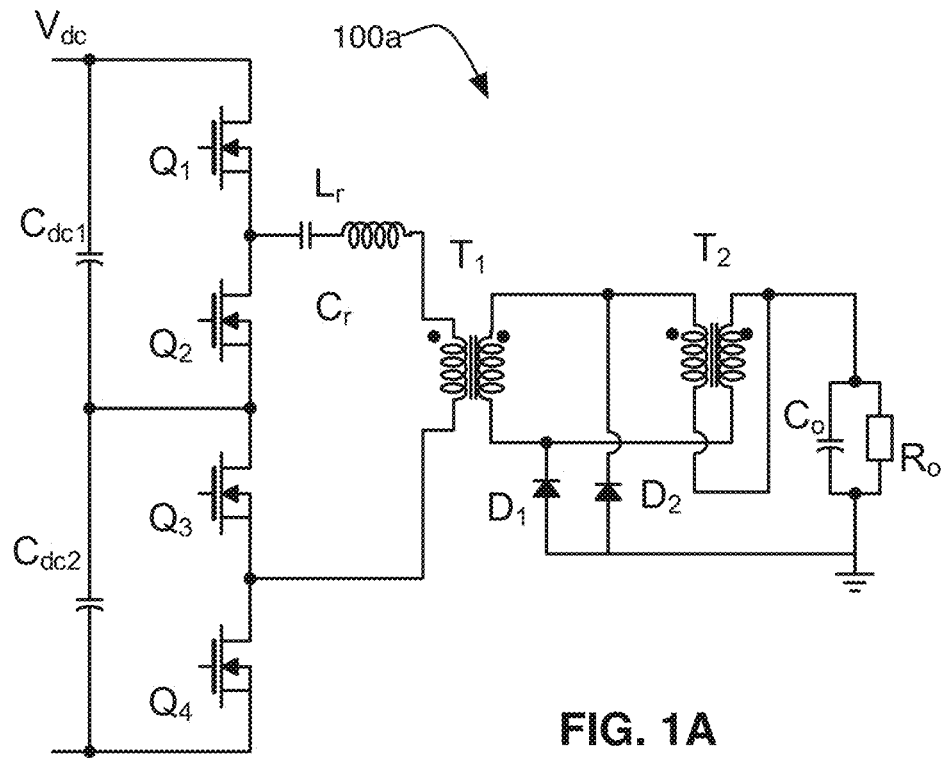
FIGS. 1A and 1B illustrates schematics of a frequency doubling resonant converter.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1A depicts an embodiment of a resonant converter 100a. Converter 100a receives an input voltage Vdc across DC bus capacitors Cdc1 and Cdc2, which are coupled in series between the positive and negative DC input voltage rails. In some embodiments, the input voltage may be 48Vdc, which may be supplied from AC mains power by another converter stage (not shown), although it is understood that any input voltage deemed suitable for a given application may be used. Switches Q1, Q2, Q3, and Q4 are connected in a ladder configuration between the positive and negative DC input voltage rails. Switches Q1-Q4 may be operated in a "two half-bridge toggle operation" to form two half-bridge resonant inverters. This mode of operation is described in greater detail below with respect to FIGS. 2 and 3.

The two half-bridge inverters produce an AC voltage, which may be taken between the node joining Q1 and Q2 and the node joining Q3 and Q4. This AC voltage may be somewhat higher than the DC voltage required by the load Ro. Thus, it may be provided to a step-down transformer T1 via a series resonant circuit including inductor Lr and capacitor Cr. Transformer T1 can have a desired turns ratio to reduce the AC voltage from the output level of the inverter to a level suitable for delivery to the load Ro (after rectification by diodes D1, D2). In some embodiments, it may be desirable to keep the turns ratio of transformer T1 relatively low to provide increased magnetic coupling and decreased leakage inductance. For example, in an embodiment with an input voltage of 48Vdc, an output voltage of 1Vdc, and a power rating of approximately 1200 W, the turns ratio of transformer T1 may be 6:1.

Figure 1B:
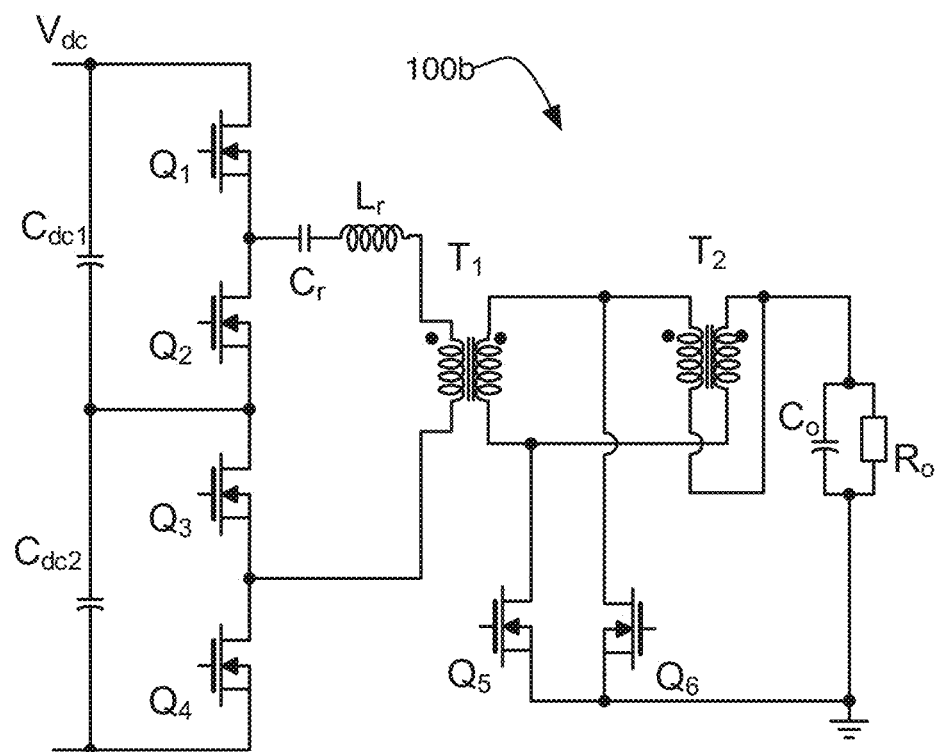

In some embodiments, an optional interphase transformer T2 may be provided to increased current to the load as described in greater detail below with respect to FIG. 3. Also, as mentioned above, diodes D1 and D2 may rectify the AC voltage appearing across the secondary of transformer T1 to provide a DC output voltage to load Ro (across output capacitor Co). It will be appreciated that the rectifier configuration will be slightly different if interphase transformer T2 is omitted, but they will in general be a full wave rectifier arrangement to provide a DC voltage and current to load Ro. FIG. 1B illustrates an alternative converter 100b in which rectifier diodes may be replaced with synchronous rectifier switches Q5 and Q6, which may have a lower forward voltage drop reducing associated losses. Other than employing a synchronous output rectifier, converter 100b may be constructed and operated in the same fashion as converter 100a.

Figure 2:
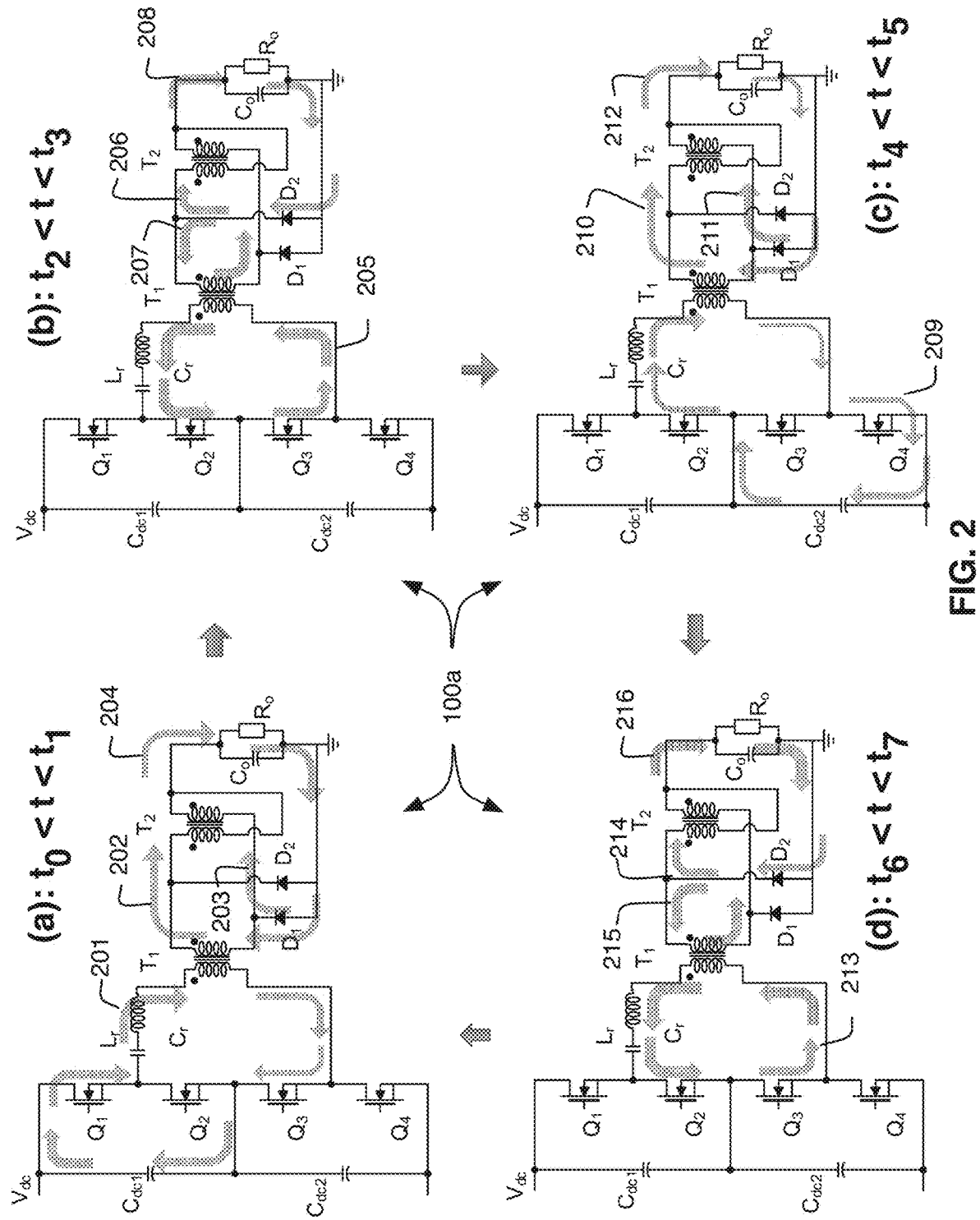
FIG. 2 illustrates the switching phases of a frequency doubling resonant converter.
Figure 3:
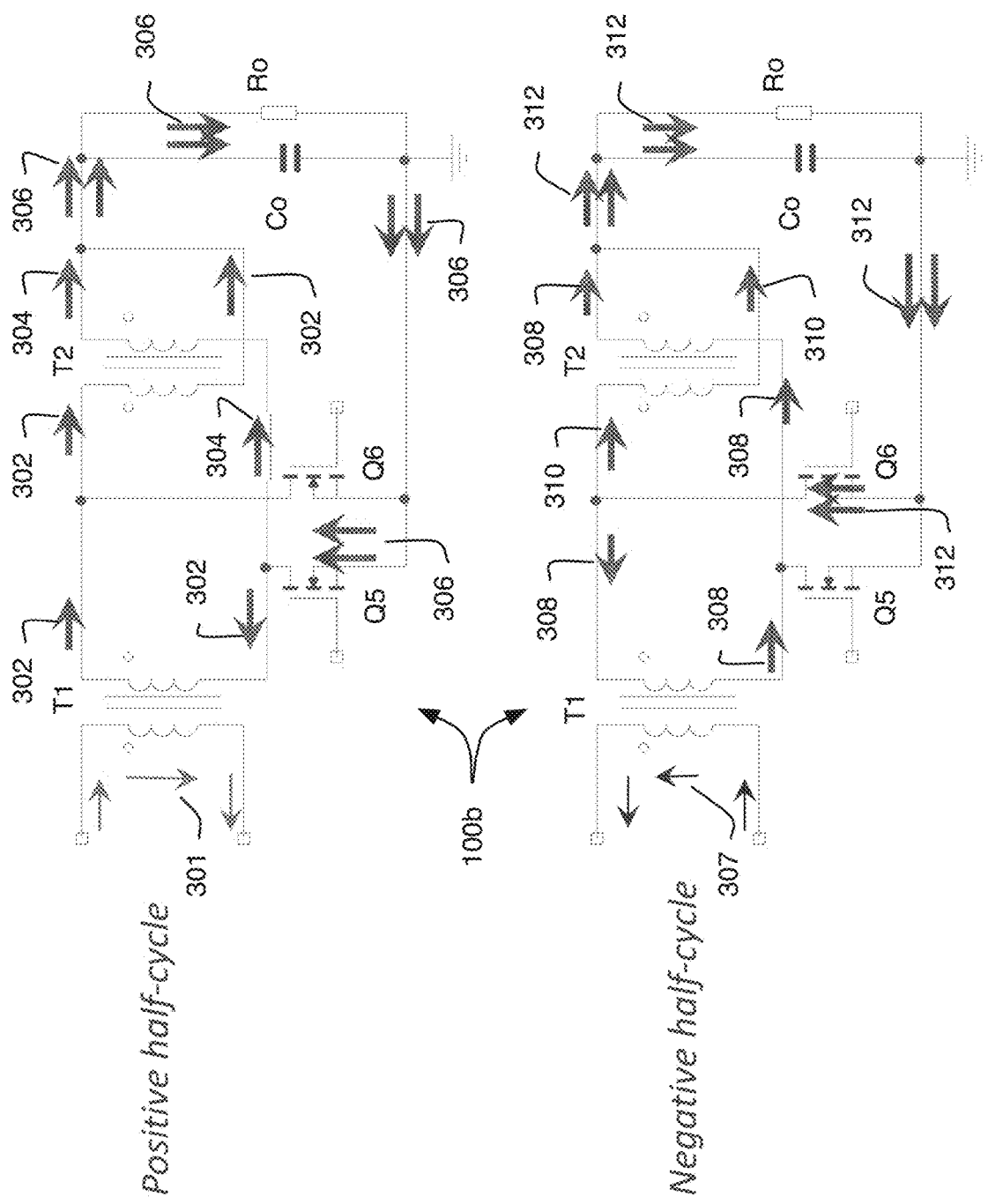
FIG. 3 illustrates the output current doubling effect of an interphase transformer in a frequency doubling resonant converter.
Figure 4:
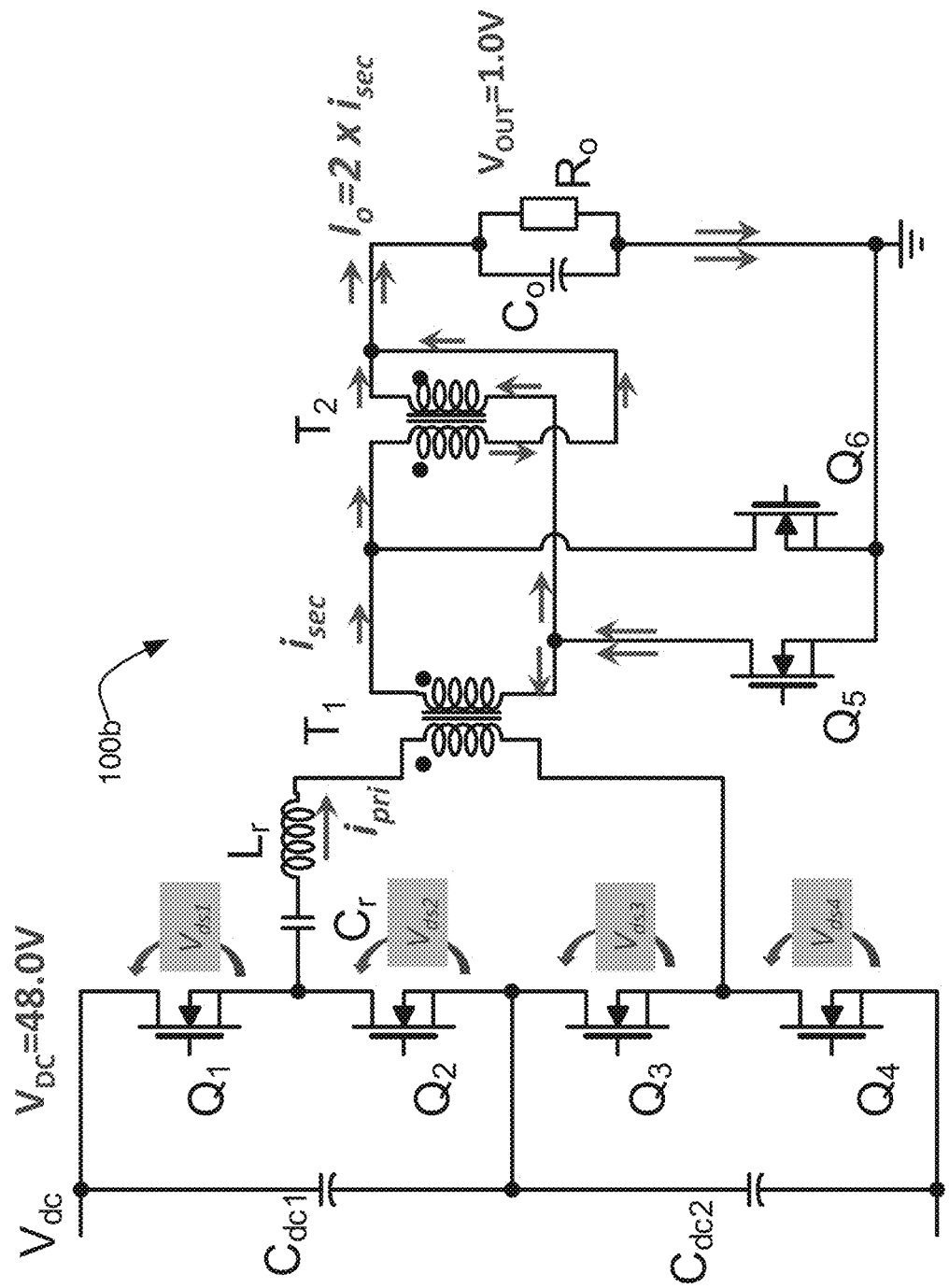
FIG. 4 illustrates a schematic of a frequency doubling resonant converter identifying pertinent waveforms.
Figure 5:
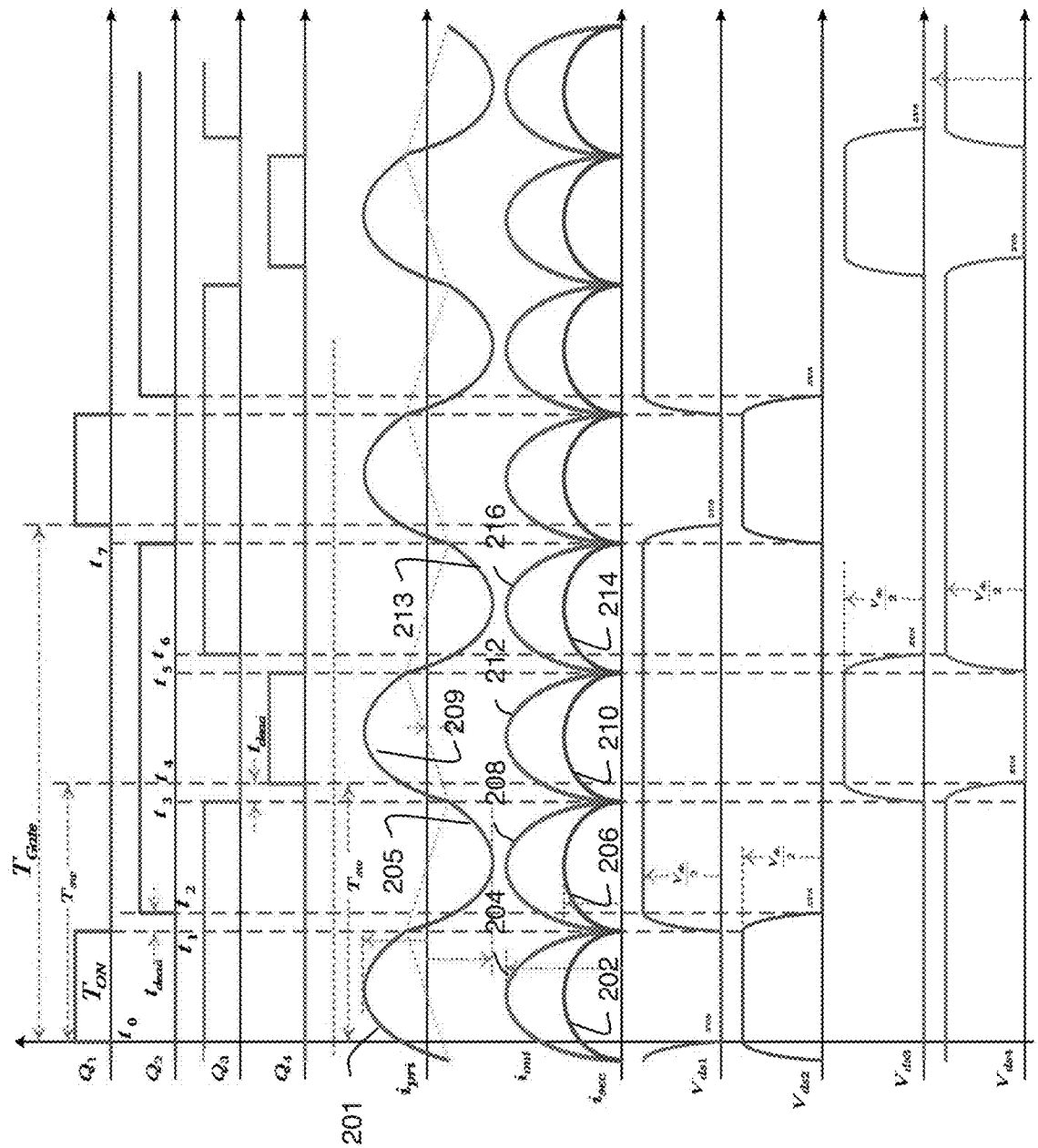
FIG. 5 illustrates various waveforms of a frequency doubling resonant converter.

Turning now to FIGS. 2, 4, and 5, the switching sequence of converter 100a is illustrated. FIG. 2 illustrates the current flows in the four switching phases (a)-(d), which correspond to time intervals illustrated in conjunction with the waveforms of FIG. 5. FIG. 4 identifies the various waveforms of FIG. 5 using a schematic of converter 100b (which operates the same as converter 100a, except for use of synchronous rectifier switches Q5/Q6 as discussed above). More specifically, in FIG. 5, waveforms Q1, Q2, Q3, and Q4 identify the switching states of switches Q1, Q2, Q3, and Q4, with a high signal corresponding to the switch being on. Waveform ipri is the current in the primary winding of transformer T1, which is a sinusoidal AC current generated by the inverter circuitry. Waveform isec is the current in the secondary winding of transformer T1, which is a full wave rectified sine wave that is otherwise proportional to the primary current ipri. Waveform io is the output current signal, which is doubled by interphase transformer T2 as described below with reference to FIG. 3. Finally, waveforms Vds1, Vds2, Vds3, and Vds4 are the drain-to-source voltages appearing across switches Q1, Q2, Q3, and Q4, respectively. The circuit locations of all of these waveforms are depicted in FIG. 4.

Beginning at time t0 (FIG. 5), switch Q1 is turned on, and switch Q3 has been on. This allows a primary current (ipri) segment 201 (FIG. 2) to circulate from positive DC voltage rail, through switch Q1, through the resonant circuit made up of capacitor Cr and inductor Lr, through the primary winding of transformer T1, through switch Q3, through capacitor Cdc1, returning to the positive DC voltage rail. This primary current segment 201 is a positive half cycle sinusoid, and induces a secondary current (isec) segment 203, also a half cycle sinusoid, which circulates through load Ro via rectifier diode D1. As mentioned above and described below with respect to FIG. 3, secondary current segment 203 may be doubled by interphase transformer T2 to produce output current (io) segment 204, which also produces secondary current segment 203.

At time t1, switch Q1 is turned off, with switch Q3 remaining on, ending switching phase (a). After a suitable dead time tdead, at time t2, switch Q2 is turned on, beginning switching phase (b). As can be seen with reference to FIG. 5, specifically waveform Vds2, this is a zero voltage switching event. Zero voltage switching leads to improved operating efficiency of the converter, and the dead time may be selected at least in part to allow time for the resonant primary current ipri to reverse, flowing through the intrinsic body diode of switch Q2, thereby allowing for zero voltage turn-on.

Switching phase (b) thus begins with the turn on of switch Q2 allowing primary current (ipri) segment 205 to circulate through switch Q2, resonant circuit Cr/Lr, and the primary winding of transformer T1. As can be seen in FIG. 5, primary current segment 205 is a negative half cycle sinusoidal current, which induces a corresponding secondary current (isec). Because the polarity of the primary current has reversed, rectification on the secondary side switches from diode D1 to diode D2. This allows secondary current segment 206 and corresponding output current (io) segment 208 to remain a positive current with respect to the load Ro, with secondary current segment 207 through the secondary winding of T1 reversing.

At time t3, switch Q3 is turned off, with switch Q2 remaining on, ending switching phase (b). After a suitable dead time tdead, at time t4, switch Q4 is turned on, beginning switching phase (c). As can be seen with reference to FIG. 5, specifically waveform Vds4, this is a zero voltage switching event. Once Q4 is turned on, primary current (ipri) segment 209 circulates through switch Q4, capacitor Cdc2, switch Q2, which remains on (having been turned on a at the beginning of switching phase (b)), through resonant circuit Cr/Lr, and transformer T1's primary winding. As can be seen in FIG. 5, current segment 209 corresponds to a second reversal of primary current ipri, such that current segment 209 is again a positive half cycle sinusoid. As such, the induced current 210 on the secondary side switches back to rectifier diode D1, remaining a positive half cycle sinusoid with respect to load Ro. As before, load current segment 212 may be doubled by interphase transformer T2 (also producing secondary current segment 211) as described below with respect to FIG. 3.

At time t5, switch Q4 is turned off, while Q2 remains on. This ends switching stage (c). After a suitable dead time (tdead), at time t6, switch Q3 is turned on, beginning switching phase (d). As can be seen with reference to FIG. 5, waveform Vds3, this is a zero voltage switching event. Switching phase (d) thus begins with the turn on of switch Q3 allowing primary current (ipri) segment 213 to circulate through switch Q2, resonant circuit Cr/Lr, the primary winding of transformer T1, and switch Q3. As can be seen in FIG. 5, primary current segment 213 is again a negative half cycle sinusoidal current, which induces a corresponding secondary current (isec). Because the polarity of the primary current has reversed, rectification on the secondary side switches from diode D1 to back diode D2. This allows secondary current segment 214 and corresponding output current (io) segment 216 to remain a positive current with respect to the load Ro, with secondary current segment 215 through transformer T1's secondary winding reversing. At time t7, switch Q2 is turned off, while switch Q3 remains on. After a suitable dead time (tdead), switch Q1 is turned on, repeating cycle (a) discussed above.

With reference to FIG. 5, it can be seen that the primary current ipri is a sinusoidal waveform having a frequency equal to twice the switching frequency of the main switching devices. Thus, the above-described switching sequence may be considered as a two half-bridge toggle operation that results in the formation of two half-bridge resonant inverters. The two half-bridge resonant inverters operate 180° out of phase to produce an AC output waveform having a frequency that is twice the switching frequency of the inverters. This AC output waveform may be stepped down by transformer T1, which may have any desired turns ratio. Additionally, the secondary winding of transformer T1 may be connected via rectifier diodes D1, D2 (or synchronous rectifier switches Q5, Q6 as shown above in FIG. 1B) to interphase transformer T2, which may be configured to double the output current as described below with reference to FIG. 3. In any case, operation of the secondary side rectifier circuitry produces a full wave rectified sinusoid, having the same frequency as the AC waveform generated by the two half-bridge resonant inverters, that may be provided to the load Ro.

FIG. 3 illustrates the post-inverter section of converter 10b, particularly illustrating the current doubling effect of interphase transformer T2. Illustrated in the upper portion of FIG. 3 is the positive half cycle of the sinusoidal AC output voltage of the dual inverter circuit described above. In other words, in the upper portion of FIG. 3, transformer T1 primary current 301 corresponds to segments 201 and 209 of transformer primary current ipri as discussed above. Illustrated in the lower portion of FIG. 3 is the negative half cycle of the sinusoidal AC output voltage of the dual inverter circuit described above. In other words, in the lower portion of FIG. 3, transformer T1 primary current 307 corresponds to segments 205 and 213 of transformer primary current ipri as discussed above.

Positive half cycle primary current 301 flowing into the dotted end of transformer T1's primary winding induces a positive current 302 exiting the dotted end of transformer T1's secondary winding. This positive current 302 flows in series through the primary winding of interphase transformer T2, which induces a secondary current 304 in the secondary winding of interphase transformer T2. Assuming a turns ratio of 1:1 for the interphase transformer T2, current 304 is equal to current 302. These two currents, 302 and 304 combine to produce load current 306, which is delivered to load Ro and output capacitor Co. Again assuming that the turns ratio of interphase transformer T2 is 1:1, the current 306 is twice the current 302 or 304 and is thus depicted with two arrows in FIG. 3.

The combined current 306 returns through synchronous rectifier switch Q5. It will be appreciated that, as discussed above, this may also be a rectifier diode rather than a synchronous rectifier switch. Once the current has passed through synchronous rectifier switch Q5, it reaches the secondary negative rail, where it again splits into current 302 and 304. Current 302 returns through the secondary winding of transformer T1, and current 304 returns through the secondary winding of interphase transformer T2. As a result, the load current 306 can be twice the output current 302 of transformer T1.

Similarly, in the lower half of FIG. 3, negative half cycle primary current 307 flowing into the dotted end of transformer T1's primary winding induces a negative current 308 exiting the dotted end of transformer T1's secondary winding. This negative current 308 flows in series through the secondary winding of interphase transformer T2, which induces a primary current 310 in the primary winding of interphase transformer T2. Assuming a turns ratio of 1:1 for the interphase transformer T2, current 310 is equal to current 308. These two currents, 308 and 310 combine to produce load current 312, which is delivered to load Ro and output capacitor Co. Again assuming that the turns ratio of interphase transformer T2 is 1:1, the current 312 is twice the current 308 or 310 and is thus depicted with two arrows in FIG. 3. As can be appreciated from FIG. 3, current 312 flows in the same direction as current 306 discussed above, and thus the load Ro always receives positive current from converter 100b. This is achieved by returning the current through the other synchronous rectifier switch Q6.

More specifically, the combined current 312 returns through synchronous rectifier switch Q6. It will be appreciated that, as discussed above, this may also be a rectifier diode rather than a synchronous rectifier switch. Once the current has passed through synchronous rectifier switch Q6, it reaches the secondary positive rail, where it again splits into current 308 and 310. Current 308 returns through the secondary winding of transformer T1, and current 310 returns through the primary winding of interphase transformer T2. As a result, the load current 312 can be twice the output current 308 of transformer T1.

Turning back to FIGS. 4 and 5, further advantages of the illustrated converter topology and operating sequence may be appreciated. More specifically, the switching of synchronous rectifier switches Q5 and Q6, which occurs with the primary current reversals at times t1, t3, t5, and t7, also correspond to current zeros of the secondary current isec (and corresponding load current iout), so that these switching events are always zero current switching events. Additionally, the synchronous rectifier switches Q5 and Q6 also employ zero voltage switching. Zero voltage switching of the inverter switches (discussed above) combined with zero voltage and zero current switching of the synchronous rectifier switches, can significantly reduce the switching losses associated with this converter topology.

Additionally, the frequency doubling effect of the two half-bridge inverter circuits can provide various advantages. For example, the lower switching frequency decreases the switching losses associated with the inverter switches Q1-Q4. Conversely, having a relatively higher output frequency can reduce the size of the magnetic components (i.e., inductor Lr and the two transformers T1 and T2). Still another advantage arises in that none of the inverter switches Q1-Q4 are exposed to the full input voltage. Rather, each switch is exposed to, at most, one-half the input voltage. This allows the switches to be rated for lower voltage, reducing size, cost, parasitic losses, and the like. Furthermore, for some embodiments, judicious selection of the input voltage (e.g., 48Vdc) may allow use of switches already produced in substantial volumes for other applications (such as telecommunications power supplies) to be used, reducing overall costs associated with the switching devices.

Figure 6:
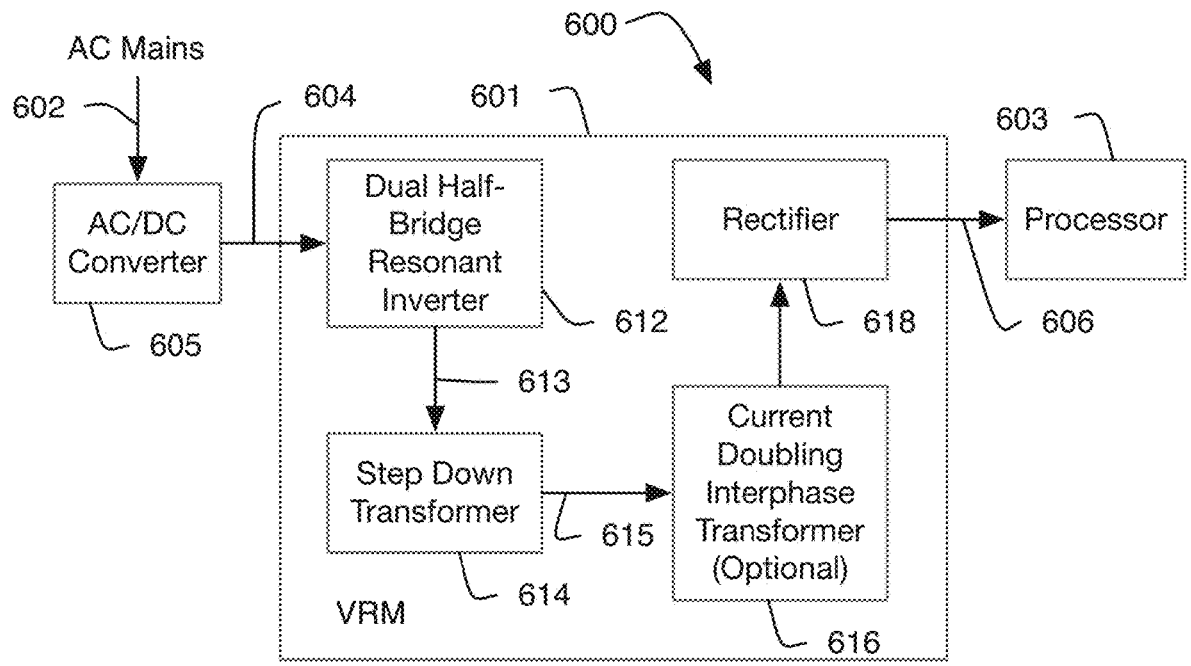
FIG. 6 illustrates an abbreviated block diagram of a computing system with a voltage regulator module (VRM) employing a frequency doubling resonant converter.

FIG. 6 illustrates an abbreviated block diagram of a computing system 600 including a processor 603 powered by a voltage regulator module (VRM) 601 employing a frequency doubling resonant converter as described herein. Such computing system may take a variety of forms, with workstation class desktop computers being one suitable application. Computing system 600 may receive AC mains power 602 at the input of an AC/DC converter 605, which may produce an intermediate DC voltage 604. In some embodiments, the AC mains power may be delivered at 120Vac or 240Vac, which are common mains supply voltages throughout the world. AC/DC converter 605 may convert this input AC voltage into an intermediate DC voltage somewhere between the mains voltage and the voltage 606 required by processor 603 (which may be on the order of 1~1.5V). Processor 603 may be a central processing unit (CPU), a graphics processing unit (GPU), a combination thereof, such as a system on chip ("SoC"), or other computing element. As described above, in some embodiments, this intermediate DC voltage 604 may be 48Vdc, although other values may also be suitable in any particular embodiment.

Intermediate DC voltage 604 may be delivered to the input of VRM 601, and particularly to the input of dual half-bridge resonant inverter 612. Dual half-bridge inverter 612 may be constructed and operated as described above to generate a frequency doubled AC voltage 613. Frequency doubled AC voltage 613 is frequency doubled in that its frequency is twice the switching frequency of the half bridge inverters, its frequency need have no particular relationship to the AC mains frequency. Additionally, the resonant circuit coupled between the inverter switching stage and the primary winding of step down transformer 614 allows improved operating efficiency for VRM 601, for example, by allowing for zero voltage switching of the inverter switches. It will be appreciated that the resonant circuit is not expressly shown in FIG. 6, in which it is considered part of the dual half-bridge resonant inverter 612.

Frequency doubled AC voltage 613 may then be provided to a step down transformer 614, which reduces the voltage to an AC voltage 615 that is approximately the same magnitude as DC voltage 606 required by processor. Stepped down AC voltage 615 may be approximately the same magnitude as required for the processor in that it accounts for any voltage drop incurred in connection with the optional current doubling interphase transformer 616 and output rectifier 618. Stepped down AC voltage 615 may be provided to an optional current doubling interphase transformer as described above. Alternatively, stepped down AC voltage 615 may be provided directly to rectifier 618, which can convert it to a DC voltage 606 required by processor 603.

Figure 7:
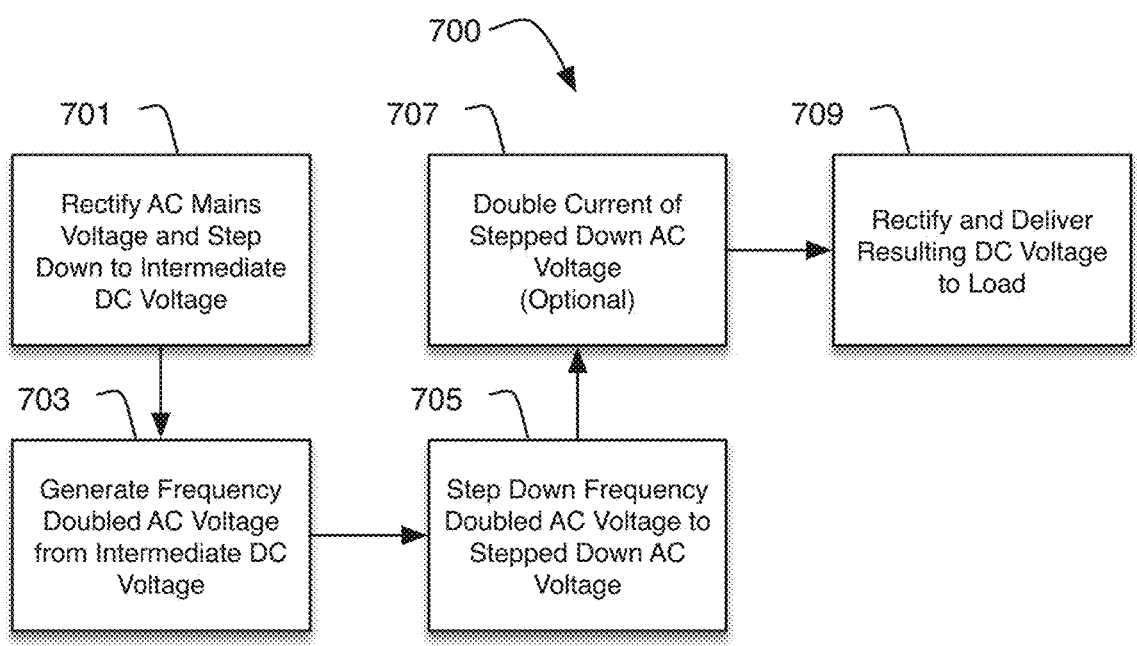
FIG. 7 illustrates a flowchart depicting the operation sequence of a frequency doubling resonant converter.

FIG. 7 illustrates a method 700 of operating of a frequency doubling resonant converter, which may be incorporated into a VRM. In block 701, an AC mains voltage may be rectified and stepped down to an intermediate DC voltage. This may be achieved by any of a variety of AC/DC converters. Alternatively, in some embodiments, a DC voltage may be provided directly. In either case, in block 703, this intermediate DC voltage may be converted into a frequency doubled AC voltage. This may be achieved through use of the dual half-bridge resonant inverter described above. In block 705, the frequency doubled AC voltage may be stepped down to a stepped down AC voltage, which may have a magnitude approximately equal to that required by the load. This step down may be performed by a step down transformer. In block 707, the stepped down AC voltage may be current doubled, for example using an interphase transformer as described above. In either case the stepped down AC voltage or the current doubled stepped down AC voltage may, in block 709, be rectified and provided to the load as a DC voltage.

Described above are various features and embodiments relating to frequency doubling resonant converters. Such converters may be used in a variety of applications, but may be particularly advantageous when used in conjunction with voltage regulator modules (VRMs) for high performance computing applications.

Additionally, although numerous specific features and various embodiments have been described, it is to be understood that, unless otherwise noted as being mutually exclusive, the various features and embodiments may be combined in any of the various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A frequency doubling resonant converter comprising:
   a dual half bridge resonant converter, having an upper half-bridge and a lower half-bridge, configured to receive an input DC voltage and convert it to an frequency doubled AC voltage having a frequency twice the switching frequency of the dual half bridge resonant converter by:
      turning on an upper switch of the upper half-bridge, while an upper switch of the lower half-bridge is turned on;
      turning off the upper switch of the upper half bridge while leaving on the upper switch of the lower half bridge;
      turning on a lower switch of the upper half-bridge;
      turning off the upper switch of the lower half bridge while leaving on the lower switch of the lower half bridge;
      turning on a lower switch of the lower half bridge;
      turning off the lower switch of the lower half bridge;
      turning on the upper switch of the lower half bridge; and
      turning off the lower switch of the lower half bridge;
   a step down transformer configured to reduce the frequency doubled AC voltage to a stepped down AC voltage; and
   a rectifier configured to convert the stepped down AC voltage into a DC output voltage for delivery to a load.

2. The frequency doubling resonant converter of claim 1 further comprising an interphase transformer coupled between the step down transformer and the rectifier and configured to increase an output current of the converter.

3. The frequency doubling resonant converter of claim 2 wherein the interphase transformer doubles an output current received from the step down transformer.

4. The frequency doubling resonant converter of claim 1 wherein a resonant circuit and a primary winding of the step down transformer are coupled in series between a junction of a first and second switching device in the ladder of four switching devices and a junction of a third and fourth switching device in the ladder of four switching devices.

5. The frequency doubling resonant converter of claim 4 wherein the resonant circuit is an series LC circuit.

6. The frequency doubling resonant converter of claim 1 wherein the rectifier comprises one or more diodes.

7. The frequency doubling resonant converter of claim 1 wherein the rectifier comprises one or more synchronous rectifier switches.

8. A method of producing a DC output voltage, the method comprising:
   using a dual half-bridge resonant inverter, having an upper half-bridge and a lower half-bridge, to convert an intermediate DC voltage into a frequency doubled AC voltage having a frequency twice a switching frequency of the dual half-bridge resonant inverter, by:
      turning on an upper switch of the upper half-bridge, while an upper switch of the lower half-bridge is turned on;
      turning off the upper switch of the upper half bridge while leaving on the upper switch of the lower half bridge;
      turning on a lower switch of the upper half-bridge;
      turning off the upper switch of the lower half bridge while leaving on the lower switch of the lower half bridge;
      turning on a lower switch of the lower half bridge;
      turning off the lower switch of the lower half bridge;
      turning on the upper switch of the lower half bridge; and
      turning off the lower switch of the lower half bridge;
   stepping down the frequency doubled AC voltage to produce a stepped down AC voltage; and
   rectifying the stepped down AC voltage to produce the DC output voltage.

9. The method of claim 8 wherein the intermediate DC voltage is produced by converting an AC mains voltage into the intermediate DC voltage.

10. The method of claim 9 further comprising using an interphase transformer to double a current of the stepped down voltage, wherein rectifying the stepped down AC voltage comprises rectifying the current doubled stepped down voltage.

11. The method of claim 8 further comprising using an interphase transformer to double a current of the stepped down voltage, wherein rectifying the stepped down AC voltage comprises rectifying the current doubled stepped down voltage.

12. The method of claim 8 wherein using the dual half-bridge resonant inverter to convert an intermediate DC voltage into a frequency doubled AC voltage comprises interposing a dead time between at least one turn off event and at least one turn on event.

13. The method of claim 12 wherein one or more switching operations comprise zero voltage switching of the switching devices.

14. A voltage regulator module for supplying power to a processor, the voltage regulator module comprising:
   a dual half-bridge resonant converter configured to receive an input DC voltage and convert it to an frequency doubled AC voltage having a frequency twice the switching frequency of the dual half bridge resonant converter further, the dual half-bridge resonant converter further comprising:
      a ladder of four switching devices coupled between a positive DC voltage rail and a negative DC voltage rail;
      a resonant circuit coupled between a junction of first and second switching devices of the ladder and a junction of third and fourth switching devices of the ladder;
   a step down transformer configured to reduce the frequency doubled AC voltage to a stepped down AC voltage, the step down transformer having a primary winding coupled in series with the resonant circuit between a junction of first and second switching devices of the ladder and a junction of third and fourth switching devices of the ladder and a secondary winding;

an interphase transformer configured to double a current of the stepped down AC voltage, the interphase transformer having a primary winding coupled in series between a first terminal of the step down transformer secondary winding and a first terminal of an output capacitor and a secondary winding coupled in series between a second terminal of the step down transformer secondary winding and the first terminal of the output capacitor;

first and second rectifier devices coupled to a second terminal of the output capacitor and respectively coupled to first and second terminals of the secondary winding of the step down transformer.

15. The voltage regulator module of claim 14 wherein the first and second rectifier devices are diodes having anodes coupled to the second terminal of the output capacitor and cathodes respectively coupled to the second and first terminals of the secondary winding of the step down transformer.

16. The voltage regulator module of claim 14 wherein the first and second rectifier devices are synchronous rectifier switches having drains coupled to the second terminal of the output capacitor and sources respectively coupled to the second and first terminals of the secondary winding of the step down transformer.

17. The voltage regulator module of claim 14 wherein the resonant circuit is an LC circuit.

18. The voltage regulator module of claim 17 wherein the resonant circuit is a series LC circuit.

* * * * *